July 5, 1938.   J. BELL   2,122,508
SIGNALING DEVICE
Filed July 26, 1933   2 Sheets-Sheet 1

INVENTOR
BY Joseph Bell
H. C. Karel.
ATTORNEY

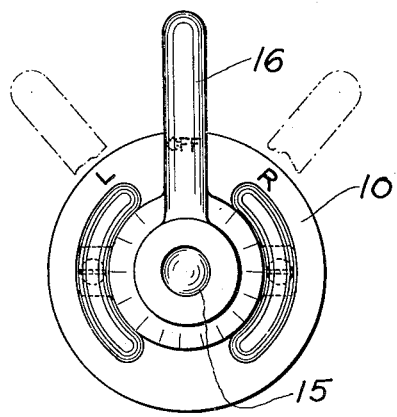
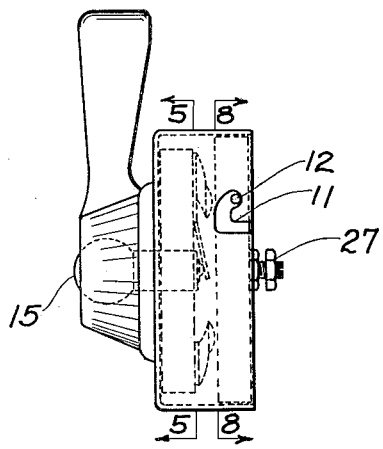
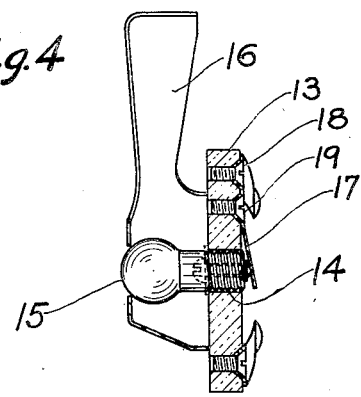
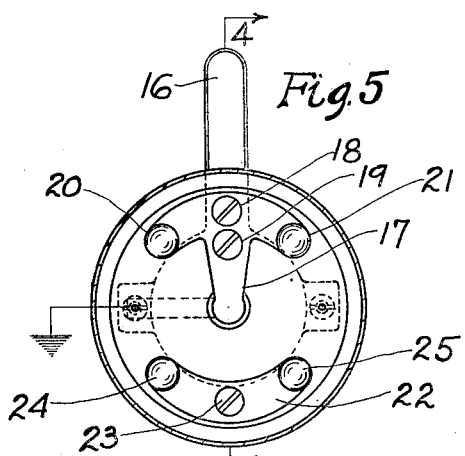
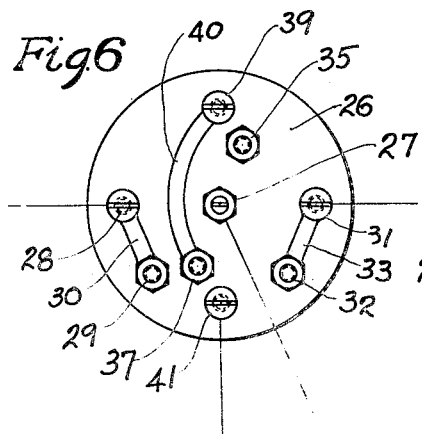
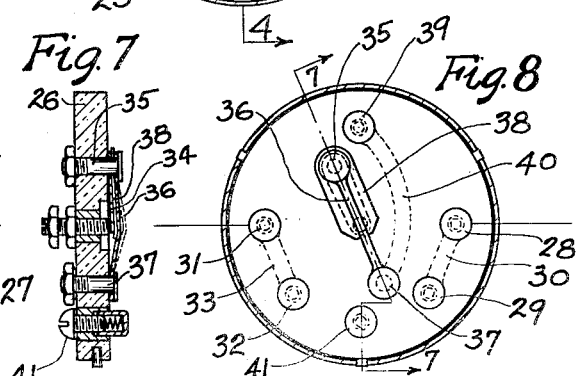

Patented July 5, 1938

2,122,508

UNITED STATES PATENT OFFICE 2,122,508

SIGNALING DEVICE

Joseph Bell, Cincinnati, Ohio

Application July 26, 1933, Serial No. 682,304

3 Claims. (Cl. 177—337)

My invention relates to a signaling device particularly adapted for use on motor vehicles.

Many devices have been designed to obviate the necessity of having the driver of a motor vehicle extend his hand or arm outside the car to indicate an intended change of direction or a stop. Most of these devices have been unsatisfactory for numerous reasons such as failing to properly attract the attention of nearby drivers and pedestrians. Others have been unsatisfactory not only because of improper or inadequate indication but also because they failed to properly indicate with a minimum of attention from the vehicle driver.

The principal object of my invention is to provide a signaling device which is readily visible and will clearly indicate to all nearby persons an intended change of direction or a stop or both simultaneously. My device is so designed that a stop light signal may be given on both sides of the car at the same time or a stop light signal given on one side of the car and a directional turn indicated on the other side simultaneously.

Another object of my invention is to provide means for clearly and quickly indicating to the driver of the vehicle whether or not the direction indicator is operating as desired.

Another object of my invention is to provide a signal controlling device which will be inexpensive to manufacture, install and maintain. Since there are no moving parts in the operating or controlling mechanism, practically no difficulty will be encountered in efficiently maintaining the device in operative condition.

In the particular embodiment of my invention selected for illustration:

Fig. 2 is a top plan view of the controlling member,

Fig. 3 is a side elevation of the controlling member,

Figure 1:
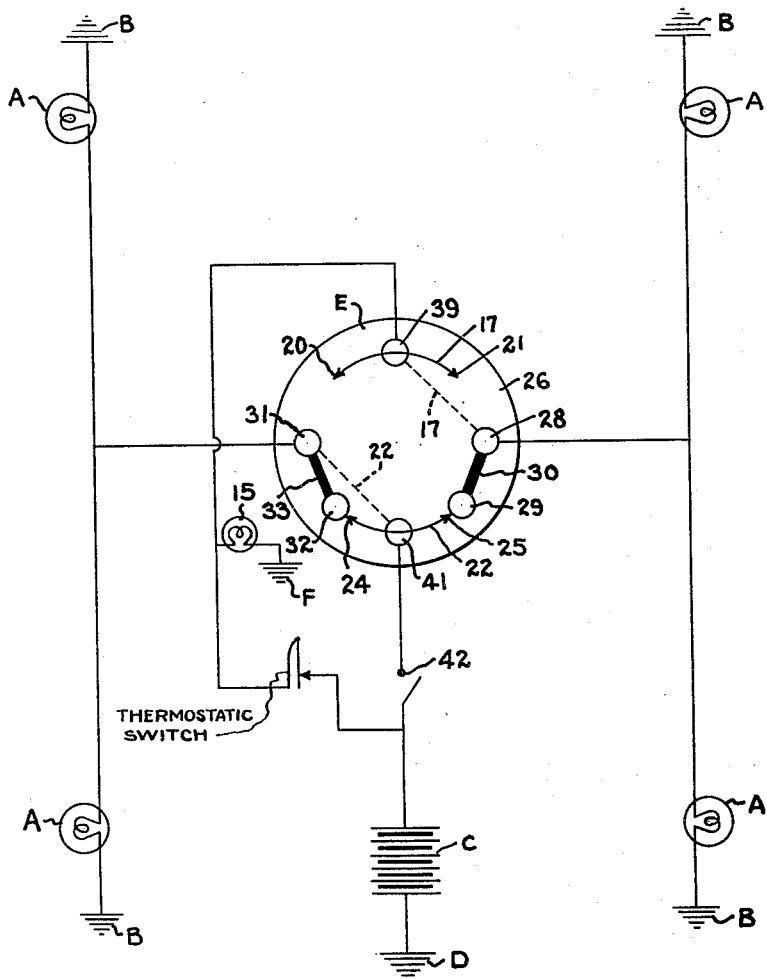
Fig. 1 is both a wiring diagram and diagrammatic view of the device.

Fig. 4 is detail of the controlling member taken on the section line 4—4 of Fig. 5, Fig. 5 is a front view of the movable portion of the controlling member taken on the section line 5—5 of Fig. 3, Fig. 6 is a rear plan of the stationary portion of the controlling member, Fig. 7 is a section of the stationary portion of the controlling member taken on the line 7—7 of Fig. 8, and;

Fig. 8 is a front view of the stationary portion of the controlling member taken on the line 8—8 of Fig. 3.

Referring now to the drawings:

I preferably provide any suitable signaling lamps A, placed both at the front and rear and at each side of the motor vehicle, the lamps being suitably grounded as indicated at B. The front and rear lamps on each side are connected on one circuit so that one entire side of the automobile will give the same indication simultaneously. The usual battery C grounded at D provides electrical current through the controlling mechanism E grounded at F to operate the signaling lamps.

The controlling mechanism is provided in any suitable casing 10 which is held in place by means of a bayonet joint with a slot 11 and pin 12. The movable portion 13 of the controlling mechanism is provided with a socket 14 in which is placed the telltale bulb 15 to indicate whether or not the device is operating as hereinafter described. Any suitable operating lever 16 is provided preferably integral with the movable member 13. On the inside of the movable member 13 is secured the contact member 17 secured thereto by means of screws 18 and 19 and its inner end contacts the base of the bulb 15. The member 17 is provided with contact points 20 and 21 for the purpose hereinafter described. At the lower end of the movable member 13 is secured another contact member 22 by means of screw 23 and having contact points 24 and 25.

The stationary portion 26 of the controlling mechanism as shown particularly in Figs. 6, 7 and 8 is provided with a central contact post 27 to which is connected the lead wire from the battery C or any other suitable source of electrical energy. Contact posts 28 and 29 connected by strap 30 carry current to the right hand lights on the front and rear of the vehicle. Contact posts 31 and 32 connected by strap 33 carry current to the left hand lights on the front and rear of the vehicle. A spring contact tongue 34 secured at one of its ends to the contact post 35 rests on its other end against the inner end of the contact post 27 although normally it has a tendency to spring away from contact with the post end. An actuating member 36 of any suitable metal and of reduced cross-section is secured at one of its ends to the contact post 35 and at its other end to the contact post 37 so as to permit no longitudinal movement and is separated from the contact tongue 34 by means of an insulator 38 also secured to the contact post 35. The actuating member 36 is a conductor of reduced cross-section and forms part of the electrical circuit. The contact post 39 is electrically connected with the contact post 37 by means of strap 40. The contact post 41 is provided with a lead wire to the stop light switch 42 which is operated by the foot brake pedal 43 (shown in Fig. 1).

When the switch or controlling mechanism is in the position shown in Fig. 3, and in Fig. 1 and Fig. 2 in full line, the contact points 24 and 25 seat against the contact posts 29 and 32 respectively and the contact points 20 and 21 are entirely out of contact. Current then may flow from the battery C through 42 into the contact post 41 which seats against the contact member 22 and through the contact point 24 and post 32, strap 33, post 31 out to the front and rear left hand lights when the stop light switch 42 is closed. Thus a constant light is maintained as long as this switch 42 is closed. At the same time current flows through 41, 22, 25, 29, 30 and 28 into the right front and rear lights causing a constant light as long as the stop light switch is closed.

When it is desired to make a right hand turn with the vehicle the lever 16 is rotated to the right and the contact points 24 and 25 seat against the contact posts 41 and 31 respectively. The contact points 20 and 21 seat against the contact posts 28 and 39 respectively, as indicated in dotted lines in Fig. 1. Current then flows from the battery C into the contact post 27, contact tongue 34, post 35, actuating member 36, post 37, strap 40, post 38, contact point 21, contact point 20, post 28 and thence to the right hand lights. At the same time current flows through the member 17 to the pilot light 15. As current flows through the actuating member 36 of reduced cross-section it heats the member causing it to expand. Since this member is secured at both of its ends it cannot expand longitudinally and therefore bulges outwardly to the dotted line position shown in Fig. 7 permitting the spring contact tongue 34 to spring outwardly breaking its contact with post 27. Consequently the right hand lights in the front and rear and the pilot light will immediately go off since the circuit has been broken. After the actuating member 36 has been expanded outwardly for an instant it cools off and contracts back to its normal position again pressing the contact tongue 34 against the contact post 27 closing the circuit and again lighting the right hand lights. After an instant the actuating member 36 again becomes heated and expands and the same operation is repeated over and over causing a constant flickering of the signaling member until the lever 16 is returned to its normal upright or off position. While the switch is in the right hand position just previously described and with the stop light switch 42 closed, current flows from the battery C into the contact post 41, the contact point 24, the contact member 22, contact point 25, contact post 31 and into the left hand lights causing a constant light on the left as long as the stop light switch is closed. Consequently a stop light signal may be given on one side of the car while a turn is being indicated on the other side of the car by a constant flickering.

When a left hand turn is to be made the lever 16 is rotated to the left to the position shown in dotted line in Fig. 2. Current then flows from the battery C through the contact post 27, contact tongue 34, contact post 35, actuating member 36, post 37, strap 40, post 39, contact point 20, contact member 17, contact point 21, contact post 31 and thence to the left hand front and rear lights. Heating of the member 36 causes a flickering of the left hand lights and the pilot light as described in the previous similar right hand operation. At the same time current flows from the battery C through the stop light switch 42 when closed, into the contact post 41, contact point 25, member 22, contact point 24, contact post 28 and thence to the right hand lights causing a constant light as long as the switch 42 remains closed.

When the operating lever 16 is in off position no current flows through the member 17 into the telltale bulb 15 and it remains unlighted. When a turn is being made either to the right or left, current is flowing through the member 17 into the bulb 15 causing the same flickering as takes place in the signaling lamps and indicating to the driver of the vehicle whether or not his turn is being indicated as desired. If a bulb burns out in one of the signaling lamps, current insufficient to cause expansion of the actuating member 36 flows through the circuit and the telltale bulb will remain lighted constantly as long as the lever is in a right hand or left hand position. If any of the conductors or the ground connection becomes broken between the controlling member and any of the signaling lamps, current insufficient to cause expansion of the actuating member 36 will flow through the circuit and the telltale bulb will remain constantly lighted without any flickering. If the telltale bulb burns out or a lead wire from the battery to the controlling member becomes broken the telltale bulb will not light at all.

It can readily be seen that the same current carried through the same electrical circuit for lighting the signal lamps is utilized for causing a flickering signal. This is accomplished entirely by using a part of the feed conductor of reduced cross-section which is provided to carry the current to the signaling lamps and no other parts are necessary to accomplish this function.

While I have shown and described the actuating member for flickering the lights as placed within the switch or control housing it will be understood that same may be placed outside and in another place in the electrical circuit.

While the invention has been described above in its preferred form, it will be obvious that various changes and modifications can be made therein without departing from the spirit or scope thereof and it is therefore desired that only such limitations be imposed thereon as are necessitated by the prior art or specifically set forth in the claims.

What I claim as new is:

1. In a signaling system, a current source, a pair of signal lights, a normally open brake-operated switch, a second switch having a neutral position and two selectively settable positions, means responsive to the closing of said first mentioned switch when said second switch is in neutral position to constantly energize both lights, and further means, including a current interrupter, responsive to the closing of said first mentioned switch when said second switch is in either settable position to constantly energize one of said lights and intermittently energize the other light.

2. In a signaling system, a current source, a pair of signal lights, a normally open brake-operated switch, a second switch having a neutral position and two selectively settable positions, means responsive to the closing of said first mentioned switch when said second switch is in neutral position to constantly energize both lights, and further means, including a current interrupter, responsive to the closing of said second switch in either settable position to intermittently energize one of said lights.

3. In a signal system for motor vehicles, a pair of signal lights located at the rear of said vehicle one at each side thereof, electrical circuits operated by the brake pedal of said vehicle for illuminating both of said lights steadily when said brake pedal is depressed to present a visible stop signal indication, a pair of secondary circuits each including one of said lights, a flashing device in said secondary circuits, and means for selectively closing either one of said secondary circuits at will to cause one or the other of said signal lights to flash intermittently to indicate the direction of a turn to be made by said vehicle.

JOSEPH BELL.